May 3, 1932. U. G. TODD 1,856,979

EXTRACT AND BEVERAGE AND METHOD FOR MAKING THE SAME

Filed Nov. 16, 1926 2 Sheets-Sheet 1

Fig.1

INVENTOR
Ulysess G. Todd
BY
his ATTORNEYS

May 3, 1932. U. G. TODD 1,856,979
EXTRACT AND BEVERAGE AND METHOD FOR MAKING THE SAME
Filed Nov. 16, 1926 2 Sheets-Sheet 2
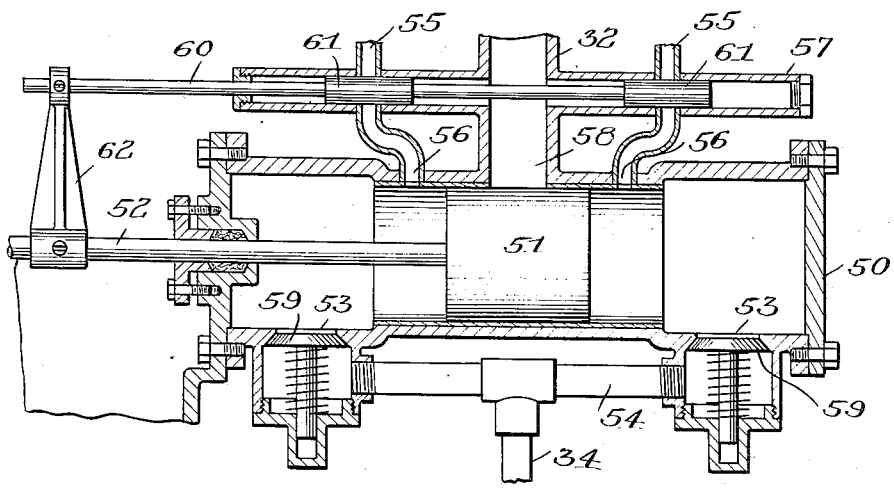
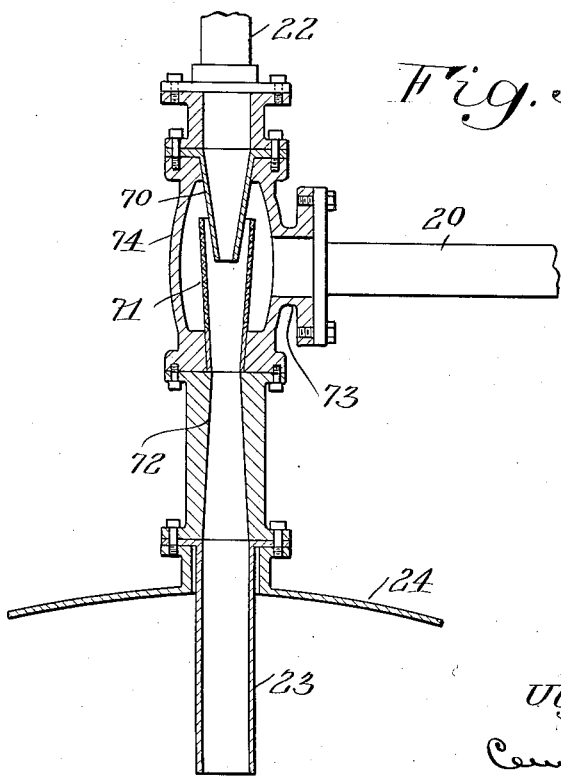
INVENTOR
Ulysess G. Todd
BY
his ATTORNEYS Patented May 3, 1932

1,856,979

UNITED STATES PATENT OFFICE

ULYSSES G. TODD, OF ROCHESTER, NEW YORK, ASSIGNOR TO THE PFAUDLER COMPANY, OF ROCHESTER, NEW YORK, A CORPORATION OF NEW YORK

EXTRACT AND BEVERAGE AND METHOD FOR MAKING THE SAME

Application filed November 16, 1926. Serial No. 148,719.

This invention relates to an improved method for de-esterizing, de-alcoholizing and concentrating beverages, fruit juices and the like.

In the manufacture of near beer, for example, fermentation is allowed to proceed until the beer has an alcoholic content substantially the same as that of pre-prohibition beer. This is necessary in order to allow sufficient time for the extraction of those substances which give the beer its flavor. Before the beer may be marketed a portion of the alcohol must be removed, and in many instances the density must be increased by the removal of some of the water content. If the beer is heated to evaporate the alcohol and a portion of the water the flavoring substances which are highly volatile, some of them being in the form of dissolved gases, pass off with the distillate and are lost. It is highly desirable to save the flavoring matter with as little difficulty as possible and reincorporate it in the concentrated beer. According to some present practices most of the flavoring substances are driven off with the alcohol and water during the concentrating process and lost, and a poorly flavored product is obtained. I have developed a method for making near beer by means of which the flavoring substances, alcohol and water may be removed separately and the flavoring substances reincorporated in the concentrated beer without loss. My method is also adapted for the removal of flavoring substances from beverages, fruit juices and the like and their incorporation in liquids other than those from which they were removed, and for the concentration of liquids containing volatile substances which it is desired to have present in the concentrated product. It is to be understood that the use of my method is not to be confined to the manufacture of beer, but it may be used in all instances where problems similar to those presented in the beer industry are encountered.

An object of this invention is to provide an improved method for making near beer.

Another object is to provide an improved beverage.

Another object is to provide a continuous closed system for the removal and reincorporation of flavoring substances in beverages.

Another object is to provide a closed system for the manufacture of flavoring extracts.

Another object is to provide a closed system for the concentration of beverages.

Another object is to provide an improved de-esterizer for beverages, fruit juices, and the like.

Another object is to provide an improved method for the reincorporation of flavoring substances in the mother liquor.

Another object is to provide an improved method for condensing volatilized flavoring substances.

Another object is to provide an improved method for removing flavoring substances from liquids.

Other objects will be in part obvious or in part pointed out hereinafter.

The invention accordingly consists in the features of construction, combinations of elements, and arrangements of parts as will be exemplified in the structure hereinafter described, the method hereinafter described and the product of the method, and the scope of the application will be indicated in the following claims.

In the accompanying drawings in which is shown one of the possible embodiments of this invention, Figure 1 shows a general elevation of the system;

Figure 2 shows a sectional view of a portion of the pump which cooperates with the de-esterizer; and Figure 3 shows a sectional view of the educator condenser.

Similar reference characters refer to similar parts throughout the several views of the drawings.

Referring now to the drawings in detail, 10 indicates the inlet for the liquid to be treated; 11 indicates a preheater through which the liquid passes; 12 indicates a pipe line for conducting the heated liquid to the spray device 13 located within the de-esterizer, or vacuum pan, 14; 15 indicates a spray member located within the de-esterizer and through which steam is passed from the steam line 18; 16 indicates a pipe line for conducting vapors and gases away from the de-esterizer 14; 17 indicates a condenser for condensing vapors from the de-esterizer; 20 indicates a pipe line for conducting the condensate and gases from the condenser 17 to the eductor condenser 21; 22 indicates a pipe through which a liquid is conducted into the eductor condenser 21; 23 indicates a pipe for conducting the liquid from the eductor condenser to a point below the outlet 25 in the receiver; 26 indicates a lower outlet for the receiver 24 through which the unfinished liquid, or beverage, or extract passes to the pipe conductor 27 to be forced by the pump 30 through the pipe 31, cooler 44, and pipe 22 into the eductor condenser; 28 indicates a filter for preventing the passage of gases to the pump 30; 32 indicates a lower outlet for the de-esterizer through which the de-esterized liquid passes to pump 33 to be forced through pipe 34 into the de-alcoholizer or concentrator 35; 36 indicates a discharge outlet for conducting alcohol and water away from the concentrator and to which there is ordinarily attached a vacuum pump (not shown); 37 indicates a pipe for conducting the concentrated liquid to pump 38 which forces it through pipe 39 to the cooler 40; 41 indicates a pipe for conducting the cooled concentrated liquid to the pipe line 27; and 29 indicates an equalizing tank for filling machines, provided at its bottom with a suitable outlet.

Referring now to Figure 2; 50 indicates, generally, a liquid chamber having a piston 51 and piston rod 52 slidably mounted therein and provided with an inlet opening 58, pressure equalizing ports 56 and discharge ports 53. Pipes or conduits 55 communicate with the interior of the liquid chamber through ports 56. Tubular members 57 are mounted on conduits 55 and de-esterizer discharge pipe 32 which communicates with the interior of the liquid chamber through inlet opening 58. A rod member 60 carrying valves 61 is slidably mounted within the tubular members 57 and attached to piston rod 52 by means of an arm 62. Ports 53 are normally closed by spring valves 59 and have communication with pipes 54 through which the liquid is conducted to a common conduit 34.

Considering, now, the operation of the pump in connection with the de-esterizer or vacuum pan 14. The conduits 55 extend to points above the normal liquid line in the de-esterizer and have communication with the interior thereof. When the piston is at the end of a stroke and in position to start the return stroke it is clear of the inlet opening 58, the valve 61 which is farthest from the piston has moved to such a position that the port 56 with which it cooperates is open. The vacuum pan and liquid chamber are then in communication through a conduit 55, the pressure is equalized and liquid may flow from the vacuum pan through conduit 32 and inlet opening 58 to the chamber. On the return stroke, the piston closes the opening 58, valve 61 closes the port 56 which was open and the liquid is forced out of the chamber through port 53 against spring valve 59. When the piston has reached the end of the return stroke the inlet opening is again open and the other valve 61 has moved to open the other port 56 and the liquid may again flow into the chamber. The pressure in the chamber is somewhat reduced by the action of the piston on the return stroke, and some liquid will flow to the chamber when the conduits 55 are not provided, but the provision of conduits 55 insures equalization of pressures and a maximum flow of liquid. The valves 61 may be eliminated with good results. The ports 56 are relatively small and located close to the inlet opening and only a slight amount of liquid would pass back to the vacuum pan if the valves 61 were not present.

Referring now to Figure 3; 74 indicates a substantially tubular jacket member provided with a side opening 73 which has communication with pipe 20 through which the flavoring substances are conducted. A hollow member 70 of substantially frustro-conical outline is positioned within the jacket 74 with its smaller end extending inwardly and downwardly to a point adjacent the center of the opening 73, and extends within the large end of a similarly shaped member 71 having a plurality of perforations, or slots, extending downwardly and inwardly. A member 72 having a central opening of substantially the same size and shape as the central opening in the member 71 is positioned with its small end against the small end of member 71, and its large end in contact with an end of the conduit 23 which extends into the receiver 24. The opening in the small end of member 70 is smaller than the openings in the small ends of members 71 and 72.

In operation in the system, the liquid is forced under high pressure by pump 30 through conduit 22, members 70, 71, and 72 and conduit 23, into the receiver 24. The passage of the liquid through the eductor condenser creates a suction in conduit 20 which is connected to de-esterizer 14, whereby de-esterizer 14 is evacuated and gases, vapors, and condensate from the de-esterizer, conduit 16, condenser 17 and conduit 20 are drawn into the jacket 74 and carried with the stream of liquid into the receiver 24. The flavoring substances in the form of gases, vapors, or liquids are intimately mixed with the liquid in the eductor condenser and substantially entirely incorporated in the liquid while it is passing therethrough. A further mixing action takes place in the receiver where the liquid and flavoring substances from the eductor condenser are forced into the body of liquid contained therein beneath the surface.

Water for cooling and condensing purposes is introduced to condenser 17 through conduit 42 and passes from condenser 17 through conduit 43 to cooler 44, thence through conduit 45 to cooler 40 and is wasted through conduit 46. Steam for heating the liquid is introduced to preheater 11 through conduit 47.

The coolers and condensers of this apparatus may be of any known and suitable construction. The vacuum pan or de-esterizer may also be of any suitable shape. The de-alcoholizer or concentrator may be of any suitable shape or construction, but a vacuum concentrator is preferable. The equalizing tank may be omitted with good results, but its inclusion insures a completely closed system. The filter 28 is preferably composed of felt or other textile material. The pump 38 is similar in construction to the pump 33, except that the inclusion of pressure equalizing means is optional.

In operation, using beer, the liquid is introduced to the system through the pipe line 10 and passes first to a pre-heater 11 of any desired construction where the temperature is raised to the boiling point of a high vacuum. The heated liquid then passes through pipe line 12 to the downwardly directed spray 13 located within the vacuum pan, or de-esterizer 14. As the liquid is sprayed within the pan a jet or current of steam is played against it for the purpose of aiding in the separation of the flavoring substances in the form of vapors and gases, from the mother liquor, and for aiding in elevating them to a vent at the top of the pan which is connected to a pipe 16 through which they are drawn by suction to a surface condenser 17 of any desired construction. The partly de-esterized, or de-flavored liquid falls to the bottom of the pan 14 where it remains for a sufficient length of time to permit removal of the remainder of the flavoring substances by evaporation. The de-esterized or de-flavored liquid is removed from the vacuum pan by means of pump 33. Proper regulation of the temperature of the liquid, the pressure within the vacuum pan and the rate of removal of the liquid from the vacuum pan permits a complete separation of the flavoring substances from the liquid and leaves the alcohol in the liquid to be removed in a later operation. The pump 33 forces the de-flavored, or de-esterized liquid through pipe 34 to the concentrator or de-alcoholizer 35 where the alcohol and surplus water are removed and the liquid concentrated to the desired density. The concentrated liquid is drawn through pipe 37 by pump 38 and forced by the said pump to a cooler 40 and thence through pipes 41 and 27 to pump 30 which forces it through pipe 31 to cooler 44 and thence to eductor condenser 21. The passage of the liquid through the eductor condenser evacuates the de-esterizer 14 and draws the vapors and gases from the de-esterizer through pipe 16, condenser 17 and pipe 20 to the eductor condenser where they are condensed and incorporated in the concentrated liquid and fall therewith into the receiver 24. The finished liquid passes through the pipe or conduit 25 to the equalizer tank 29 from which it may be drawn to bottling machines or appropriate containers.

In using the apparatus for making flavoring extracts, or solutions of essential oils, the conduit leading from the concentrator may be closed by any suitable means, and a solvent fed into the receiver in any suitable manner, such as by connecting the pipe 27 to a source of supply. The mother liquor, such as fruit juices and the like, containing the flavoring substances or essential oils, may be fed into the de-esterizer, and the flavoring substances or essential oils removed and conducted to the receiver for incorporation in the solvent. The barren liquor from the de-esterizer may be wasted, or conducted to any suitable receiver for storage or other purposes, or passed through the concentrator and then passed to other apparatus for the recovery of sugars or other valuable ingredients.

From the foregoing it will be seen that there is herein provided an apparatus which embodies the features of this invention and achieves the objects thereof. An improved completely closed, continuously operating system is provided which is dependable in operation, and by means of which beverages may be quickly and cheaply de-alcoholized and concentrated; fruit juices, beverages or the like may be quickly and cheaply concentrated; flavoring substances and essential oils may be quickly and cheaply removed from a mother liquor or other solution and incorporated in a suitable solvent; the processes may be quickly and efficiently carried out; and new and improved products may be obtained.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim as my invention:

1. The method of treating a liquid containing flavoring and aromatic substances which comprises removing therefrom a plurality of ingredients including flavoring and aromatic substances, and incorporating said flavoring and aromatic substances in a body of liquid from which said plurality of ingredients have been removed by circulating said body of liquid repeatedly through a closed path and supplying said flavoring and aromatic substances to said body of liquid during such circulation.

2. The method of treating a potable liquid containing volatile flavoring ingredients which comprises removing said volatile ingredients from said liquid in one container, transferring the liquid to another container, removing another ingredient from said liquid in said other container, transferring the residual liquid to a closed circuit, circulating the residual liquid repeatedly through said closed circuit, and adding the previously removed volatile ingredients to said residual liquid while the latter is flowing through said closed circuit.

3. The continuous method of treating a potable liquid containing volatile flavoring ingredients which comprises supplying such liquid substantially continuously to a container, removing volatile ingredients substantially continuously from said liquid in such container, transferring liquid substantially continuously to another container, removing another ingredient from said liquid in said other container, transferring the residual liquid substantially continuously from said other container to a closed circuit, circulating the residual liquid repeatedly through said closed circuit, withdrawing volatile ingredients substantially continuously from said first mentioned container, and supplying said volatile ingredients to said closed circuit to be incorporated in the residual liquid flowing therethrough.

ULYSESS G. TODD.